(12) United States Patent
Ingram

(10) Patent No.: US 7,543,368 B2
(45) Date of Patent: Jun. 9, 2009

(54) FLEXIBLE CONNECTORS AND METHODS OF MANUFACTURING SAME

(75) Inventor: Thomas L. Ingram, Keller, TX (US)

(73) Assignee: Flex-ing, Inc., Sherman, TX (US)

( * ) Notice: Subject to any disclaimer, the term of this patent is extended or adjusted under 35 U.S.C. 154(b) by 340 days.

(21) Appl. No.: 11/347,529

(22) Filed: Feb. 3, 2006

(65) Prior Publication Data

US 2006/0123617 A1 Jun. 15, 2006

Related U.S. Application Data

(62) Division of application No. 10/689,279, filed on Oct. 20, 2003, now Pat. No. 7,140,648.

(51) Int. Cl.
*B23P 11/00* (2006.01)
*F16L 13/14* (2006.01)

(52) U.S. Cl. ........................ 29/516; 29/447; 29/890.144

(58) Field of Classification Search ............ 29/890.144, 29/508, 516, 517, 237, 447; 285/382, 382.1, 285/382.2, 382.7, 256, 222.5
See application file for complete search history.

(56) References Cited

U.S. PATENT DOCUMENTS

| | | | |
|---|---|---|---|
| 1,969,203 A | 8/1934 | Cadden et al. ............ 285/222.2 |
| 2,172,532 A | 9/1939 | Fentress |
| 2,216,468 A | 10/1940 | Farrar |
| 2,357,669 A | 9/1944 | Lake ........................ 285/222.5 |
| 2,363,586 A | 11/1944 | Quamaschalli ............ 285/222.5 |
| 2,556,544 A | 6/1951 | Johnson .................... 285/222.5 |
| 2,583,956 A | 1/1952 | Lindsay et al. ............ 285/222.5 |
| 2,848,254 A | 8/1958 | Millar |
| 2,987,329 A | 6/1961 | Barton .................... 285/222.5 |
| 3,023,496 A | 3/1962 | Humphrey .................. 228/182 |
| 3,565,116 A | 2/1971 | Gabin ........................ 138/109 |
| 4,141,576 A | 2/1979 | Lupke et al. ................ 285/369 |
| 4,232,712 A | 11/1980 | Squires ...................... 138/109 |
| 4,415,389 A * | 11/1983 | Medford et al. ............... 156/91 |
| 4,578,855 A | 4/1986 | Van Der Hagen ............. 29/447 |
| 4,693,501 A | 9/1987 | Logsdon, Jr. et al. ........ 285/173 |
| 5,069,253 A | 12/1991 | Hadley ....................... 138/109 |
| 5,190,323 A * | 3/1993 | Oetiker ........................ 285/39 |
| 5,209,267 A | 5/1993 | Morin ........................ 138/109 |
| 5,233,739 A | 8/1993 | Holden et al. ................. 29/237 |
| 5,297,586 A * | 3/1994 | McIntosh .................... 138/109 |
| 5,335,945 A | 8/1994 | Meyers ....................... 285/236 |
| 5,430,929 A | 7/1995 | Sanders ....................... 29/507 |

(Continued)

*Primary Examiner*—Essama Omgba
(74) *Attorney, Agent, or Firm*—Michael A. O'Neil

(57) ABSTRACT

A flexible connector comprises a length of corrugated tubing having a distal end and an end piece having a proximal end. The proximal end of the end piece is engaged with the distal end of the length of corrugated tubing and a length of polymeric tubing is utilized to initially retain the end piece and the length of corrugated tubing in engagement with one another. A length of mesh tubing may be extended along the length of corrugated tubing and around the exterior of the length of polymeric tubing. A sleeve is positioned in alignment with the length of polymeric tubing, with the proximal end of the end piece, and with the distal end of the length of corrugated tubing. The sleeve is crimped to permanently retain the proximal end of the end piece in engagement with the distal end of the length of corrugated tubing.

4 Claims, 4 Drawing Sheets

U.S. PATENT DOCUMENTS

| | | | |
|---|---|---|---|
| 5,511,720 A | 4/1996 | Zaborszki et al. | 228/136 |
| 5,529,098 A | 6/1996 | Bravo | 141/88 |
| 5,769,463 A | 6/1998 | Thomas | 285/49 |
| 5,803,511 A | 9/1998 | Bessette | 285/222.5 |
| 5,894,865 A | 4/1999 | Winter et al. | 138/121 |
| 6,021,818 A | 2/2000 | Horst et al. | 138/172 |
| 6,092,274 A | 7/2000 | Foti | 29/520 |
| 6,260,584 B1 * | 7/2001 | Foti | 138/109 |
| 6,378,914 B1 | 4/2002 | Quaranta | 285/256 |
| 6,866,302 B2 | 3/2005 | Furata | 285/256 |
| 6,922,893 B2 | 8/2005 | Ingram | 29/890.144 |
| 7,014,216 B2 | 3/2006 | Mittersteiner et al. | 285/247 |
| 7,017,949 B2 | 3/2006 | Luft et al. | 285/256 |
| 7,063,358 B2 * | 6/2006 | Ingram | 285/256 |
| 7,096,584 B2 * | 8/2006 | Ingram | 29/890.144 |
| 7,140,648 B2 * | 11/2006 | Ingram | 285/382 |
| 7,338,090 B2 * | 3/2008 | Baldwin et al. | 285/256 |
| 2003/0197372 A1 | 10/2003 | Hoff et al. | 285/256 |
| 2004/0094953 A1 | 5/2004 | Luft et al. | 285/256 |
| 2006/0049628 A1 | 3/2006 | Ingram | 285/256 |
| 2006/0192380 A1 * | 8/2006 | Fullbeck et al. | 285/256 |
| 2007/0079495 A1 * | 4/2007 | Ingram | 29/508 |
| 2008/0036207 A1 * | 2/2008 | Choi | 285/323 |

* cited by examiner

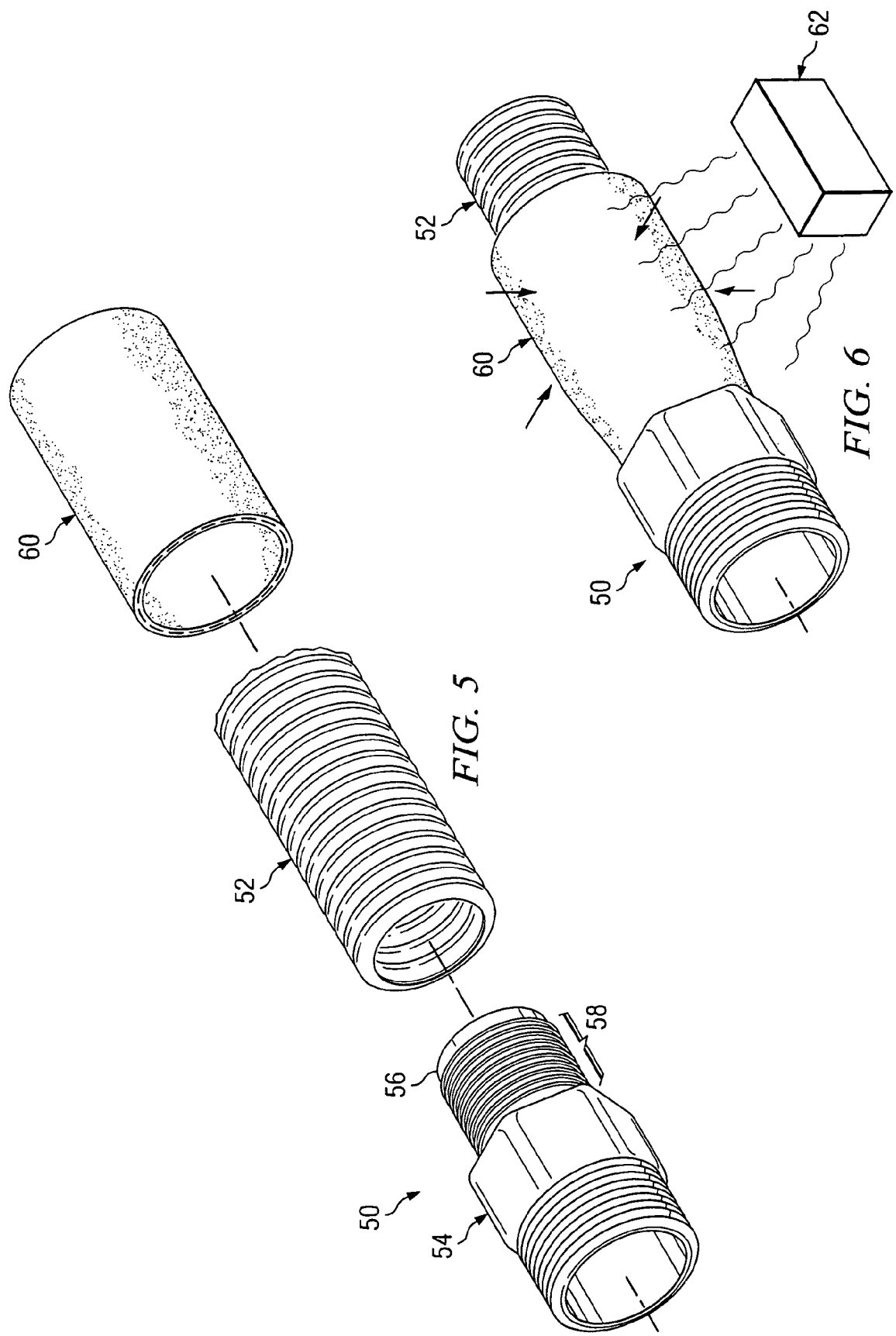

US 7,543,368 B2

FLEXIBLE CONNECTORS AND METHODS OF MANUFACTURING SAME

CROSS-REFERENCE TO RELATED APPLICATIONS

This application is a divisional application of application Ser. No. 10/689,279 filed Oct. 20, 2003, now U.S. Pat. No. 7,140,648, the entire contents of which are incorporated herein by reference.

TECHNICAL FIELD

This invention relates generally to flexible connectors of the type utilized in conjunction with fire hoses and in similar applications, and more particularly to flexible connectors which are less expensive to manufacture as compared with the prior art.

BACKGROUND AND SUMMARY OF THE INVENTION

Referring to FIGS. 1A and 1B, there is shown a typical prior art flexible connector 10. The flexible connector 10 includes a corrugated tube 12. The function of the tube 12 is to contain fluids passing through the flexible connector 10 while affording flexibility thereto. The tube 12 does not have sufficient bursting strength to withstand the high pressures often associated with typical flexible connector applications.

Therefore, the flexible connector 10 may also include a mesh tube 14 which surrounds the tube 12. The function of the mesh tube 14 is to provide the necessary bursting strength without compromising the flexibility of the tube 12. As is known to those skilled in the art, the stainless steel mesh tube 14 can be omitted in low pressure applications.

The tubes 12 and 14 extend the entire length of the flexible connector 10. At each end thereof there is provide a sleeve 16. The function of the sleeve 16 is to facilitate manipulation of the flexible connector 10 both during connection thereof to other instrumentalities and during use.

FIGS. 1A and 1B also illustrate the construction of the flexible connector 10. First, the corrugated tube 12, the mesh tube 14, and the sleeve 16 are assembled as shown in FIG. 1A, that is, with the ends thereof substantially aligned. Thereafter, a weldment 18 is formed around the ends of the tube 12, the tube 14, and the sleeve 16. The weldment 18 secures all three components one to another. Of course, in applications in which the tube 14 is omitted, only the tube 12 and the sleeve 16 are secured by the weldment 18.

Following the welding step shown in FIG. 1A, a weldment 20 is employed to secure an end piece 22 at each end of the flexible connector 10. As will be appreciated by those skilled in the art, the end piece 22 shown in FIG. 2A is representative only. In actual practice numerous types and kinds of end pieces are utilized in the construction of flexible connectors.

As will therefore be understood, the construction of a prior art flexible connector requires two welding steps both of which must be precisely executed in order that the flexible connector will be properly constructed. The type of welding required to properly assemble a flexible connector of the kind shown in FIGS. 1A and 1B requires the services of highly skilled technicians having years of experience. It will therefore be understood that the type of flexible connector shown in FIGS. 1A and 1B and described hereinabove is relatively expensive to manufacture.

The present invention comprises improvements in flexible connector design and construction which overcome the foregoing and other difficulties which have long since characterized the prior art. In accordance with the broader aspects of the invention, a flexible connector includes a corrugated tube and an end piece. The proximal end of the end piece and the distal end of the corrugated tube are engaged with one another. A length of polymeric tubing is then extended over the adjacent ends of the corrugated tubing and the end piece, thereby retaining the ends of the length of corrugated tube and of the end piece in engagement with one another.

The length of polymeric tubing may be received within a length of mesh tubing which extends the entire length of the corrugated tube and also extends over the proximal end of the end piece. A sleeve having an axial length approximating the axial length of the polymeric tubing is then extended over the end of the mesh tube. The sleeve is then crimped thereby completing the manufacture of the flexible connector.

In low pressure applications, the length of mesh tubing may be omitted. In such instances the sleeve extends over the length of polymeric tubing. Following the positioning of the stainless steel sleeve in alignment with the length of polymeric tubing and with the engaged ends of the corrugated tube and the end piece, the sleeve is crimped thereby completing the manufacture of the flexible connector.

BRIEF DESCRIPTION OF THE DRAWINGS

A more complete understanding of the invention may be had by reference to the following Detailed Description when taken in conjunction with the accompanying Drawings, wherein:

FIG. 5 is a perspective view illustrating a flexible connector comprising a second embodiment of the present invention and further illustrating initial steps in the manufacture thereof; and FIG. 6 is a perspective view illustrating subsequent steps in the manufacture of the flexible connector of FIG. 5.

DETAILED DESCRIPTION

Figure 1A:
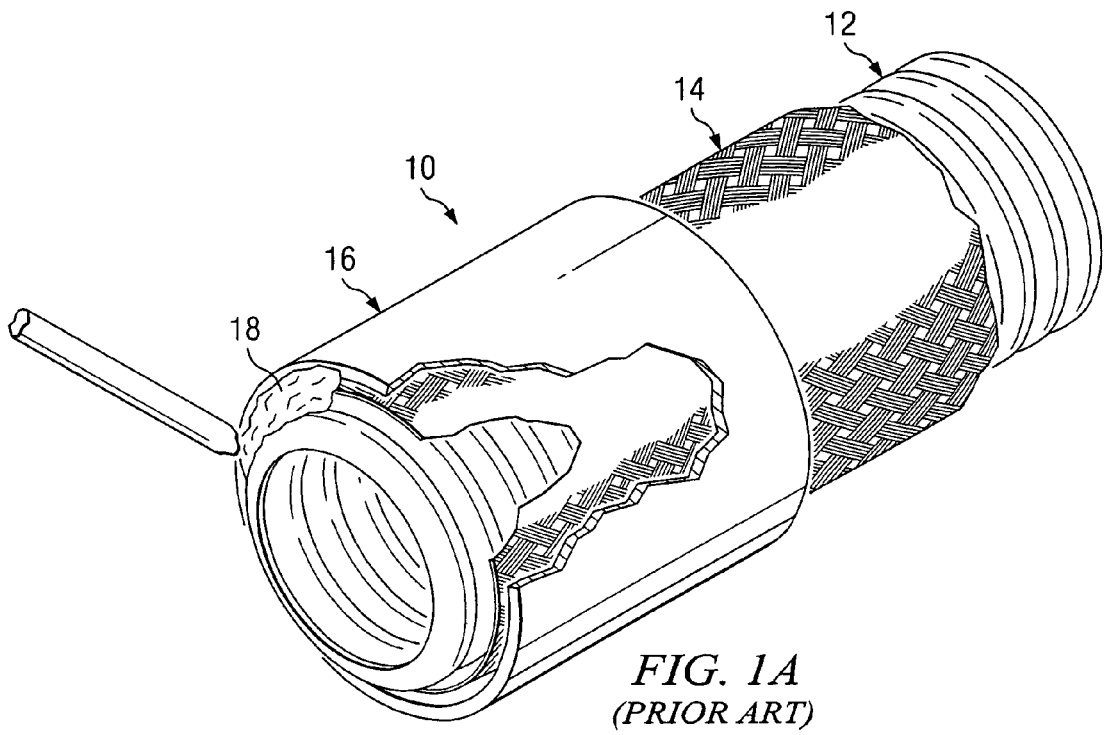
FIG. 1A is a perspective view illustrating a prior art flexible connector.
Figure 1B:
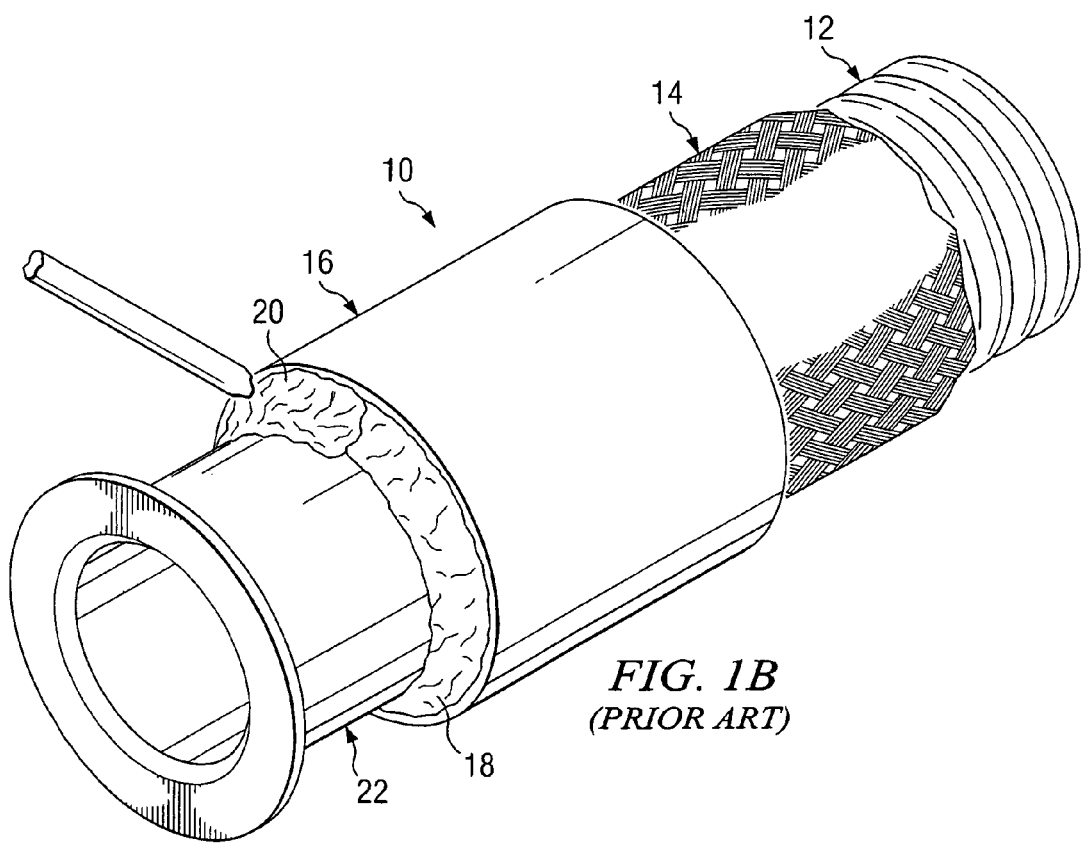
FIG. 1B is a perspective view further illustrating the prior art flexible connector of FIG. 1A.
Figure 2:
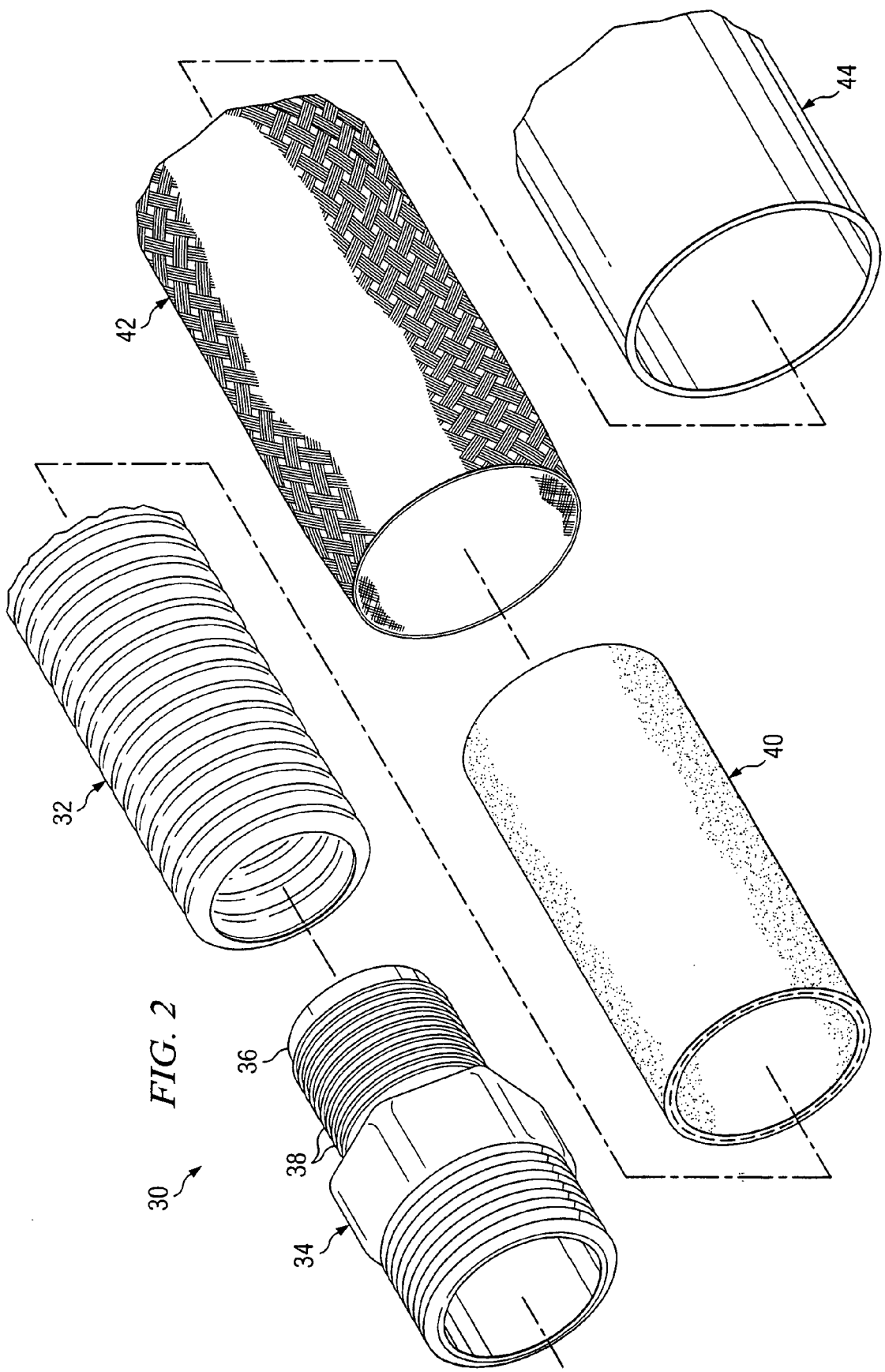
FIG. 2 is an exploded perspective view illustrating a flexible connector comprising a first embodiment of the present invention and further illustrating the initial steps in the manufacture thereof.
Figure 3:
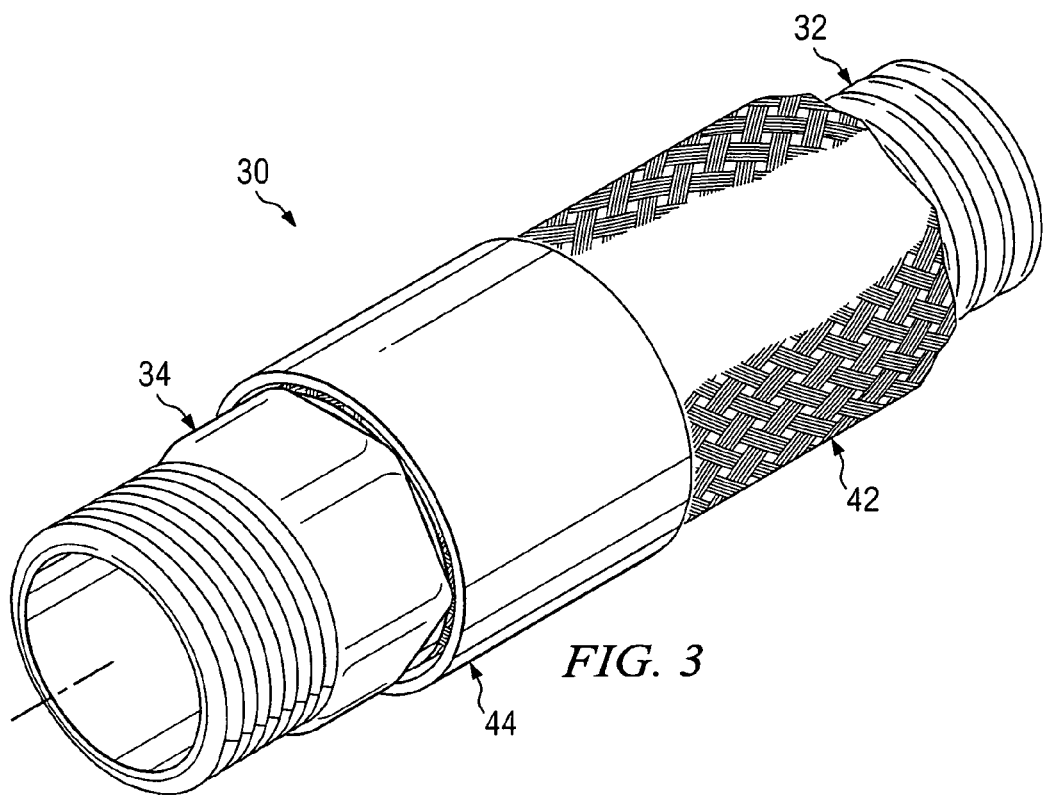
FIG. 3 is a perspective view illustrating the flexible connector of FIG. 2 following the completion of the manufacturing steps illustrated therein.
Figure 4:
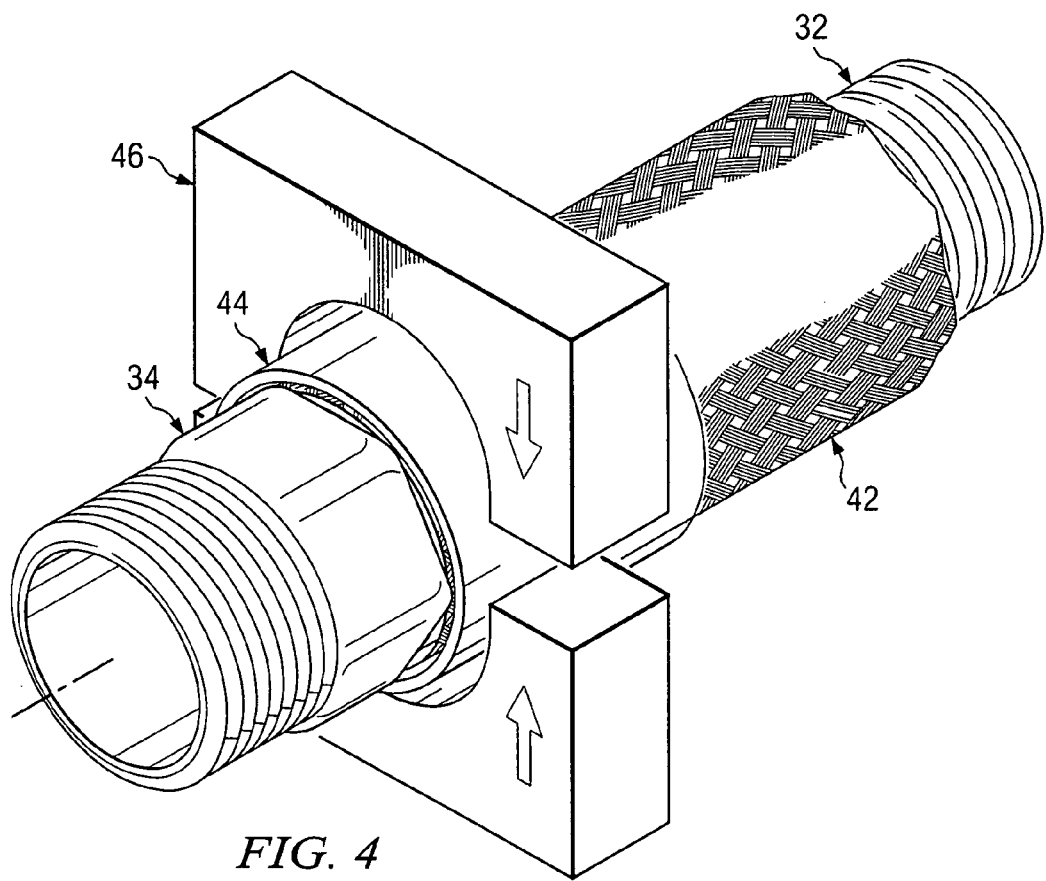
FIG. 4 is a perspective view illustrating final steps in the manufacture of the flexible connector of FIG. 2.

Referring now to the Drawings, and particularly to FIGS. 2, 3, and 4 thereof, there is shown a flexible connector 30 comprising a first embodiment of the invention. FIGS. 2, 3, and 4 further illustrate a method of manufacturing the flexible connector.

The flexible connector 30 includes a length of corrugated tubing 32 which extends substantially the entire length of the flexible connector 30. The length of corrugated tubing 32 may be formed from stainless steel, bronze, brass, carbon, monel, other metals, various polymeric materials, and other materials that will not be adversely affected by the fluid that will flow through the flexible connector 30. In most instances an end piece 34 is provided at each end of the length of corrugated tubing 32. Those skilled in the art will recognize the fact that the end piece 34 is representative only and that various types and kinds of end pieces can be utilized in the practice of the invention. The end piece 34 is provided with a proximal end 36 having a plurality of corrugations 38.

A length of flexible polymeric tubing 40 is initially extended over the exterior of the length of corrugated tubing 32 and is moved axially thereon sufficiently to expose the distal end thereof. Next, the proximal end 36 of the end piece 34 is engaged with the distal end of the length of corrugated tubing 32. Then, the length of flexible tubing 40 is moved axially along the length of corrugated tubing 32 until it moves into resilient gripping engagement with the corrugations 38 of the end piece 34. The function of the length of flexible tubing 40 is to initially retain the proximal end 36 of the end piece 34 in engagement with the distal end of the length of corrugated tubing 32.

After the flexible tubing 40 has been positioned to retain the proximal end 36 of the end piece 34 in engagement with the distal end of the length of corrugated tubing 32, a length of mesh tubing 42 is extended over the entire length of stainless steel corrugated tubing 32, and over the entire length of the flexible tubing 40, and over the corrugations 38 of the end piece 34. The length of mesh tubing may be formed from stainless steel, kynas, nylon, various textiles, or other materials depending on the requirements of particular applications of the invention. Assuming that an end piece is positioned at the opposite end of the length of corrugated tubing 32 and that the end piece at the opposite end of the length of tubing 32 also has corrugation similar to the corrugations 38, the length of mesh tubing 42 also extends beyond the end of the length of corrugated tubing 32 and over the corrugations of the end piece positioned in engagement therewith.

Following the positioning of the length of mesh tubing 42 over the length of flexible polymeric tubing 40 and over the proximal end 36 of the end piece 34 and the distal end of the length of corrugated tubing 32, a sleeve 44 is positioned over the distal end of the length of mesh tubing 42 and in alignment with the length of flexible polymeric tubing 40. The results of the foregoing steps are illustrated in FIG. 3. The sleeve 44 may be formed from stainless steel, copper, bronze, brass, steel, or other materials depending on the requirements of particular applications of the invention.

Following the assembly steps described in the preceding paragraphs, the partially finished flexible connector 30 is positioned in a crimping die 46. Those skilled in the art will understand and appreciate the fact that the crimping die 46 is diagrammatically illustrated in FIG. 4, and that the actual crimping die will not necessarily have the appearance shown in FIG. 4. The function of the crimping die 46 is to crimp the sleeve 44 into gripping engagement with the distal end of the length of mesh tubing 42, the length of flexible polymeric tubing 40, the corrugations 38 comprising the proximal end 36 of the end piece 34, and the corrugations comprising the distal end of the length of corrugated tubing 32. The crimping of the sleeve 44 therefore permanently retains the proximal end of the end piece in engagement with the distal end of the corrugated tubing 32. Thus, following actuation of the crimping die 46 at the opposite ends thereof, the fabrication of the flexible connector 30 is complete.

In the case of flexible connectors intended for low pressure applications, the length of mesh tubing 42 can be omitted. In such instances the sleeve 44 is aligned with the length of flexible polymeric tubing 40, the corrugations 38 comprising the proximal end 36 of the end piece 34, and the corrugations comprising the distal end of a length of corrugated tubing 32.

The sleeve 44 is then crimped in the manner diagrammatically illustrated in FIG. 4 thereby securing the component parts of the flexible connector in place.

Referring to FIGS. 5 and 6, there is shown a flexible connector 50 comprising a second embodiment of the present invention. The flexible connector 50 includes a length of corrugated tubing 52 which extends substantially the entire length of the flexible connector 50. The flexible connector 50 will typically include an end piece 54 positioned at each end of the length of corrugated tubing 52. Those skilled in the art will appreciate the fact that the end piece 54 is representative only and that various types and kinds of end pieces may be utilized in the practice of the invention.

Regardless of the type or kind of end piece that is utilized in the construction of the flexible connector 50, the end piece 54 is preferably provided with a proximal end 56 having a plurality of corrugations 58 formed thereon. An initial step in the manufacture of the flexible connector 50 comprises the engagement of the proximal end 56 of the end piece 54 with the distal end of length of corrugated tubing 52. Thereafter a length of heat shrink polymeric tubing 60 is moved axially along the length of corrugated tubing 52 until it extends over the corrugations 58 of the proximal end of the end piece 54 and the corrugations comprising the distal end of the length of stainless steel corrugated tubing 52.

Referring specifically to FIG. 6, after the length of heat shrink tubing 60 is positioned over the proximal end 56 of the end piece 54 and the distal end of the length of corrugated tubing 52, a radiation source 62 is utilized to heat the length of heat shrink tubing 60. Heating of the length of heat shrink tubing 60 causes the heat shrink tubing 60 to retract or shrink into rigid engagement with the distal end of the length of corrugated tubing 52 and the proximal end of the end piece 54 thereby securing the distal end of the length of corrugated tubing 52 in engagement with the proximal end of the end piece 54.

The succeeding steps in the manufacture of the flexible connector 50 are the same as the latter steps in the manufacture of the flexible connector 30 as illustrated in FIGS. 2, 3, and 4 and described hereinabove in conjunction therewith. Thus, the next step in the manufacture of the flexible connector 50 may involve extending a length of mesh tubing along the entire length of corrugated tubing 52 and over the proximal ends 56 of the end pieces 54 comprising the flexible connector 50. Thereafter, a sleeve similar to the stainless steel sleeve 44 of FIGS. 2, 3, and 4 is positioned over the distal end of the length of corrugated tubing 52 (if used), the proximal end of the end piece 54, and the now-shrunk length of heat shrink tubing 60. The final step in the manufacture of the flexible connector 50 comprises the crimping of the sleeve as illustrated in FIG. 4 and described hereinabove in conjunction therewith. In low pressure applications the length of mesh tubing may be omitted.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. A method of manufacturing a flexible connector comprising the steps of:
   providing a length of corrugated tubing having a distal end;
   providing an end piece having a proximal end;

positioning the proximal end of the end piece in engagement with the distal end of the length of corrugated tubing;

providing a length of polymeric tubing;

extending the length of polymeric tubing over the proximal end of the end piece and the distal end of the length of corrugated tubing;

utilizing the length of polymeric tubing to initially retain the proximal end of the end piece in engagement with the distal end of the length of corrugated tubing;

providing a sleeve;

positioning the sleeve in alignment with the length of polymeric tubing, with the proximal end of the end piece, and with the distal end of the length of corrugated tubing; and crimping the sleeve and thereby permanently retaining the proximal end of the end piece in engagement with the distal end of the length of corrugated tubing.

2. The method according to claim 1 wherein the step of providing a length of polymeric tubing is carried out by providing a length of flexible polymeric tubing and wherein the step of utilizing the length of polymeric tubing to initially retain the proximal end of the end piece in engagement with the distal end of the length of corrugated tubing is carried out by resiliently engaging the length of resilient polymeric tubing with the proximal end of the end piece and with the distal end of the length of corrugated tubing.

3. The method according to claim 1 wherein the step of providing a length of polymeric tubing is carried out by providing a length of heat shrink polymeric tubing and wherein the step of utilizing the length of polymeric tubing to initially retain the proximal end of the end piece in engagement with the distal end of the length of corrugated tubing is carried out by directing radiation into the length of heat shrink polymeric tubing and thereby shrinking the length of tubing into engagement with the proximal end of the end piece and with the distal end of the length of corrugated tubing.

4. The method according to claim 1 including the additional step of extending a length of mesh tubing around the exterior of the length of corrugated tubing, around the proximal end of the end piece, and around the length of polymeric tubing, and wherein the step of positioning the sleeve is carried out by positioning the sleeve around the exterior of the length of mesh tubing.

* * * * *